UNITED STATES PATENT OFFICE.

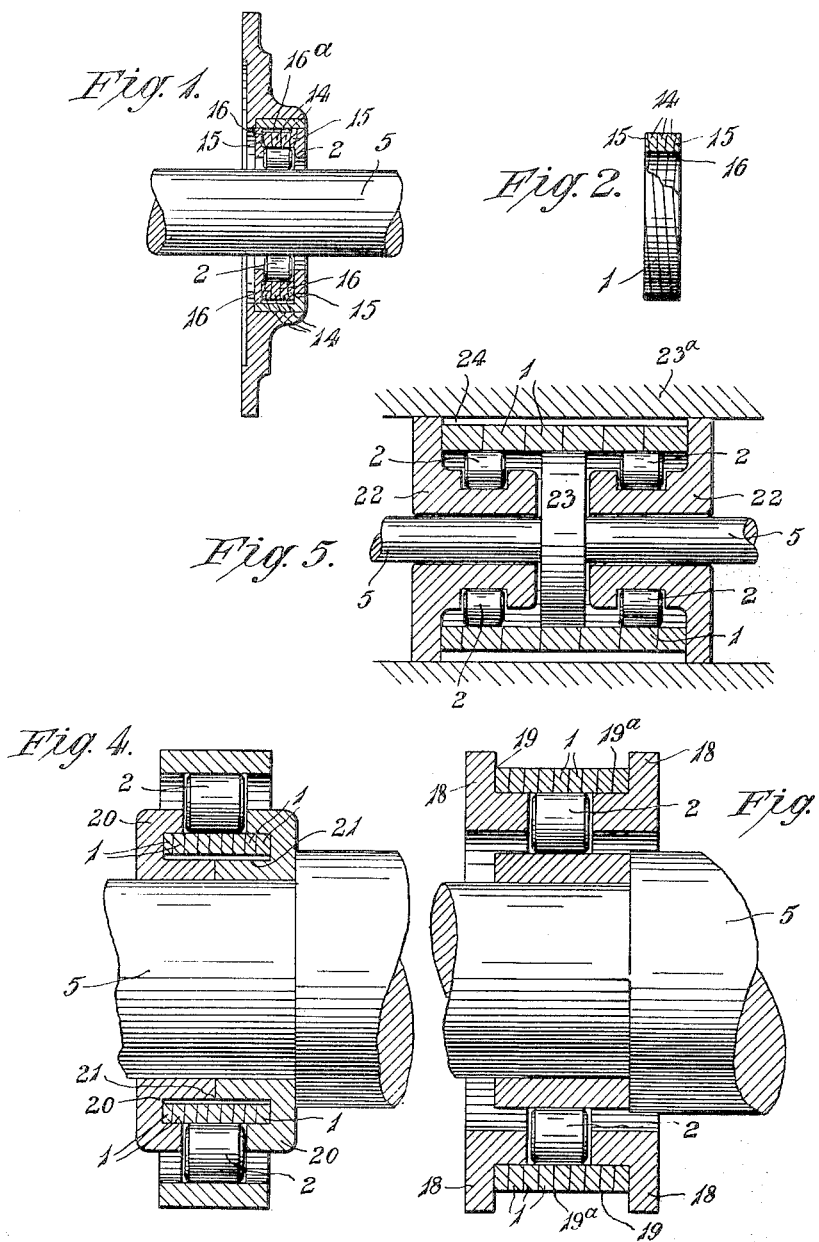

ALBERT EDWARD DABBS, OF MANCHESTER, STANLEY WHITBY SAVAGE, OF CHORLTON-CUM-HARDY, AND ALFRED HAROLD HINDLE, OF BIRMINGHAM, ENGLAND, ASSIGNORS OF ONE-EIGHTH TO ABSALOM LIDDLE, OF MANCHESTER, ENGLAND, AND ONE-HALF TO JOHN GEORGE WILLIAM GRUBAN, OF KINGSWAY, LONDON, ENGLAND.

ROLLER OR BALL BEARING.

1,346,443.          Specification of Letters Patent.     Patented July 13, 1920.

Original application filed December 5, 1918, Serial No. 265,460. Divided and this application filed September 5, 1919. Serial No. 321,965.

*To all whom it may concern:*

Be it known that we, ALBERT EDWARD DABBS, STANLEY WHITBY SAVAGE, and ALFRED HAROLD HINDLE, subjects of the King of Great Britain, residing at 19 Rowan avenue, Whalley Range, Manchester, in the county of Lancaster, England, 55 Brook road, Chorlton-cum-Hardy, Manchester aforesaid, and 51 Sandford road, Moseley, Birmingham, in the county of Warwick, England, respectively, have invented a new and useful Improvement in Roller or Ball Bearings; and we do hereby declare the following to be a full, clear, and exact description of the same.

This invention relates to roller or ball bearings of the kind in which balls or rollers are disposed between the shaft which the bearing supports or the housing and the surface of a ring freely carried by the housing or by members mounted on the shaft.

The object of the present invention is to provide an improved bearing whereby automatic self-adjustment of the bearing will be attained for inequalities in the shaft due either to the incorrect positioning of the bearing or to "whirling" of the shaft due to long distances between the bearings.

According to this invention in roller or ball bearings having a ring freely carried or supported by the housing or by members mounted on the shaft, the said ring is formed as a close helix and a clearance is provided along the whole length of the helix between the helix and its support.

This application is a divisional of application filed December 5, 1918, Serial No. 265,460 for roller or ball bearings.

Referring to the drawings:—

Figure 1. is a sectional elevation of one form of bearing constructed in accordance with this invention.

Fig. 2. is an elevation partly in section of the helix.

Fig. 3. is a sectional elevation of another form of bearing.

Fig. 4. is a sectional elevation of a further form of bearing, and

Fig. 5. is a sectional elevation showing an arrangement of double bearing.

In the construction shown in Figs. 1 and 2 the rollers 2 or balls and the helix are supported in a housing as shown and the helix is of a special construction in which the contacting sides are formed to inter-engage. The inner members 14 of the helix which are shown as three in number have their sides sloping inwardly, that is, the inside surfaces of the members 14 are narrower than their outside surfaces, while the two end members 15 of the helix are provided with inner faces which slope outwardly as shown at 16 so bringing the outer ends of the helix parallel. In this arrangement the rollers 2 or balls contact with the inner members 14 and a clearance 16ᵃ is provided between the outer surface of the helix and the inner surface of the housing 6. The clearance 16ᵃ extends for the whole length of the helix and permits expansion thereof.

The construction shown in Fig. 3 illustrates another method of securing the helix and rollers or balls and it comprises a housing formed from two annular rings 18 of angle section, the rollers 2 being held between the two rings 18 while the helix 1 is supported in the annular recess 19 formed by the angle pieces. It will be understood that the rings 18 will be contained in a suitable outer housing which is not shown in the drawing, and it will be observed that an annular clearance 19ᵃ is provided exterior to the helix 1 which clearance extends for the whole length of the helix and permits its expansion.

In Figs. 4 and 5 two other forms of the invention are illustrated, in the former as shown by Fig. 4 the helix 1 is disposed within the ring of rollers 2 or balls. In this construction the helix 1 is supported in a suitable two part housing 20 and a clearance 21 is provided between the helix 1 and the housing 20. This clearance 21 extends for the whole length of the helix and allows of its contraction. For convenience in construction and in order to have a greater wearing surface it is however preferred to arrange a helix such as 1 exterior to the ring of balls or rollers 2.

Referring to Fig. 5 in this case the helix 1 is supported on two rings of rollers 2 carried by housings 22 and the shaft 5 is provided with a collar or flange 23 which is supported by the helix 1, The housings 22 are carried in an outer housing 23ᵃ and a clearance 24 is provided between the exterior of the helix 1 and the outer housing 23ᵃ. The clearance 24 extends for the whole length of the helix 1 and permits of its expansion. The shaft 5 does not bear upon the housing 22 but passes loosely therethrough. The shaft 5 is supported by its flange or collar 23 resting upon the helix 1 which rotates with it. The helix is supported on the rollers 2 which in turn are supported by the housings 22 which do not rotate.

Instead of making the coiled strips or helices with parallel or sloping sides they may be formed to inter-engage by making the sides concave or convex.

Any known means may be provided for adjusting the tension or diameter of the helix in any of the constructions hereinbefore described.

What we claim then is:—

1. In a bearing, rotatable anti-friction members disposed between a pair of races, one of which is a ring of solid construction and the other of which is formed as a close helix having an interior surface and an exterior surface a portion of one of which forms a race for the anti-friction members, means for supporting said helix said means contacting that surface of the helix a portion of which constitutes a race, and a clearance between the whole of the opposite surface of the helix and said supporting means.

2. In a bearing, rotatable anti-friction members disposed between a pair of races, one of which is a ring of solid construction and the other of which is formed as a close helix comprising a plurality of coils said helix having an interior surface and an exterior surface a portion of one of which forms a race for the anti-friction members, means for supporting said helix said means contacting that surface of the helix a portion of which constitutes a race, and a clearance between the whole of the opposite surface of the helix and said supporting means.

3. In a bearing, rotatable anti-friction members disposed between a pair of races, one of which is a ring of solid construction and the other of which is formed as a close helix comprising a plurality of coils having inter-engaging sides, said helix having an interior surface and an exterior surface a portion of one of which forms a race for the anti-friction members, means for supporting said helix said means contacting that surface of the helix a portion of which constitutes a race, and a clearance between the whole of the opposite surface of the helix and said supporting means.

4. In a bearing, rotatable anti-friction members disposed between a pair of races, one of which is a ring of solid construction and the other of which is formed as a close helix comprising a plurality of coils some of which have inclined sides, the middle coils being wider in cross section at the outer periphery and the end coils being wider in cross section at the inner periphery, said helix having an interior surface and an exterior surface a portion of one of which forms a race for the anti-friction members, means for supporting said helix said means contacting that surface of the helix a portion of which constitutes a race, and a clearance between the whole of the opposite surface of the helix and said supporting means.

In testimony whereof we affix our signatures in presence of witnesses.

ALBERT EDWARD DABBS.
STANLEY WHITBY SAVAGE.
ALFRED HAROLD HINDLE.

Witnesses to the signature of Albert Edward Dabbs:
   JAMES L. JONES,
   EVAN DAVIES.

Witnesses to the signature of Stanley Whitby Savage:
   JNO. D. JONES,
   JOHN R. WILLIAMS.

Witnesses to the signature of Alfred Harold Hindle:
   T. GLECI V. BUTT,
   JAMES H. CARR.